US008612860B2

(12) United States Patent
Singer et al.

(10) Patent No.: US 8,612,860 B2
(45) Date of Patent: Dec. 17, 2013

(54) SYSTEMS, METHODS, AND MEDIA FOR COORDINATING THE PRESENTATION OF MEDIA WITH AN EVENT

(75) Inventors: Howard M. Singer, Morganville, NJ (US); W. Tucker McCrady, New York, NY (US)

(73) Assignee: Warner Music Inc., New York, NY (US)

( * ) Notice: Subject to any disclaimer, the term of this patent is extended or adjusted under 35 U.S.C. 154(b) by 0 days.

(21) Appl. No.: 12/855,456

(22) Filed: Aug. 12, 2010

(65) Prior Publication Data

US 2011/0041062 A1 Feb. 17, 2011

Related U.S. Application Data

(60) Provisional application No. 61/233,157, filed on Aug. 12, 2009.

(51) Int. Cl.
*G06F 3/00* (2006.01)
(52) U.S. Cl.
USPC ............................. 715/730; 715/732; 715/740
(58) Field of Classification Search
USPC ......................................... 715/730, 732, 740
See application file for complete search history.

(56) References Cited

U.S. PATENT DOCUMENTS

| 6,249,281 | B1 * | 6/2001 | Chen et al. ..................... 715/753 |
| 7,007,235 | B1 * | 2/2006 | Hussein et al. ................ 715/751 |
| 7,743,009 | B2 * | 6/2010 | Hangartner et al. ............ 706/46 |
| 7,996,436 | B2 * | 8/2011 | Schneider et al. ............. 707/802 |
| 8,204,878 | B2 * | 6/2012 | Amer-Yahia et al. .......... 707/723 |
| 8,224,390 | B2 * | 7/2012 | Alberth et al. ................. 455/566 |
| 8,280,409 | B2 * | 10/2012 | Alberth et al. ............. 455/456.3 |
| 2010/0211575 | A1 * | 8/2010 | Collins et al. ................. 707/749 |

* cited by examiner

*Primary Examiner* — David Phantana Angkool
(74) *Attorney, Agent, or Firm* — Byrne Poh LLP

(57) ABSTRACT

Systems for coordinating the presentation of media with an event are provided, the systems comprising: at least one processor that: receives media characteristic data associated with an event and target media; identifies presentation media as being target media based on the media characteristic data; determines a timing of a presentation of the presentation media; and presents the presentation media with the event according to the timing. Similar methods, and computer readable media containing instructions that perform such methods, are also provided.

27 Claims, 2 Drawing Sheets

SYSTEMS, METHODS, AND MEDIA FOR COORDINATING THE PRESENTATION OF MEDIA WITH AN EVENT

CROSS REFERENCE TO RELATED APPLICATION

This application claims the benefit of U.S. Provisional Patent Application No. 61/233,157, filed Aug. 12, 2009, which is hereby incorporated by reference herein in its entirety.

BACKGROUND

Many events are enhanced by simultaneous or otherwise associated presentation of media. For example, the presentation of music is known to enhance a broad range of events, such as social functions, advertisements, films, television programs, shopping, waiting in elevators, etc.

Traditionally, the selection of media to be presented with an event has been accomplished manually. For example, a creator or an instigator of an event may select media that the creator or instigator feels is appropriate, such as music for a party, or photographs or cartoons to accompany a presentation. However, when the creator or instigator selects the media, the media selected may not be preferred by, nor resonate with, an intended recipient. As another example, a user may select his or her own media to be presented in conjunction with certain events, such as music to suit a mood or occasion, or a short musical segment to signal an incoming telephone call, or alarm. However, the selection of one's own media content to associate with particular events can be time-consuming, and, in some cases, not sought by the user. For example, although accompanying music or other media might be desired by an advertiser, the intended recipient may not feel the need to augment the advertisement.

As a result, selection processes for accompanying media can be labor-intensive, require the voluntary participation of an intended recipient, and fail to select content that resonates with an intended audience.

In some embodiments, the ability to present certain media with the occurrence of an event can be limited by characteristics of a system in which an event is occurring. For example, with an event occurring on a mobile telephone, the presentation of a certain song upon the ringing of the telephone can be limited by bandwidth available to deliver the song to the mobile telephone prior to presentation. As another example, due to licensing constraints, certain media may be restricted from presentation on a device upon the occurrence of an event due to characteristics of the device, the event, the user of the device, etc. As yet another example, the presentation media on a device upon the occurrence of an event may be presented by the simple non-existence of the media on the device.

SUMMARY

Systems, methods, and media for coordinating the presentation of media with an event are provided. In accordance with some embodiments, systems for coordinating the presentation of media with an event are provided, the systems comprising: at least one processor that: receives media characteristic data associated with an event and target media; identifies presentation media as being target media based on the media characteristic data; determines a timing of a presentation of the presentation media; and presents the presentation media with the event according to the timing.

In accordance with some embodiments, methods for coordinating the presentation of media with an event are provided, the methods comprising: receiving media characteristic data associated with an event and target media; identifying presentation media as being target media based on the media characteristic data; determining a timing of a presentation of the presentation media; and presenting the presentation media with the event according to the timing.

In accordance with some embodiments, computer-readable media containing computer-executable instructions that, when executed by a processor, cause the processor to perform a method for coordinating the presentation of media with an event are provided, the method comprising: receiving media characteristic data associated with an event and target media; identifying presentation media as being target media based on the media characteristic data; determining a timing of a presentation of the presentation media; and presenting the presentation media with the event according to the timing.

DETAILED DESCRIPTION

Systems, methods, and media for coordinating the presentation of media with an event are provided. In some embodiments, media that is presented may be video, images, audio, multimedia, and/or any other suitable media. In some embodiments, an event may be the presentation of an advertisement (which may include any suitable media such as video, images, audio, and/or multimedia), the indication of an alert (such as an alert to an incoming message, telephone call, email, etc.), an alarm (such as an alarm clock alarm), the execution of a piece of software (such as a video game), the occurrence of a date, the arrival of the user at a particular location, specified weather conditions, the selection of other media, and/or any other suitable event.

For example, when an advertisement is presented on a user device (an event), it may be desirable to simultaneously present a song, photograph or video clip (or any other suitable media) to the user. In some embodiments, suitable data identifying one or more songs or other items of content, or characteristics of the same, may be defined. This data may then be used to determine if, for example, a suitable song is present on the device. Additionally or alternatively, this data may be used to determine if a suitable song is indicated by the user as being preferred (e.g., by inclusion in a "play-list," by being stored in a media system, by being marked as preferred by the user, etc.). If a suitable song is identified, the suitable song may then be presented along with the advertisement. The data may also define a portion of the song to be presented, and at what time before, during, or after the presentation of the advertisement the song, or the portion of the song, should be presented.

As indicated above, in some embodiments, media can similarly be identified and presented in response to events such as the arrival of a user at a particular location (such as a store, museum, historic building or house of worship), the occurrence of a date known to be important to the user (such as a birthday, anniversary or holiday), the presence or forecast of particular weather (such as a thunderstorm), the availability or presentation of certain content (such as the arrival of an email, text message, social networking update, etc., or the presentation of a Web page, a digital book or magazine, etc.), etc.

Figure 1:
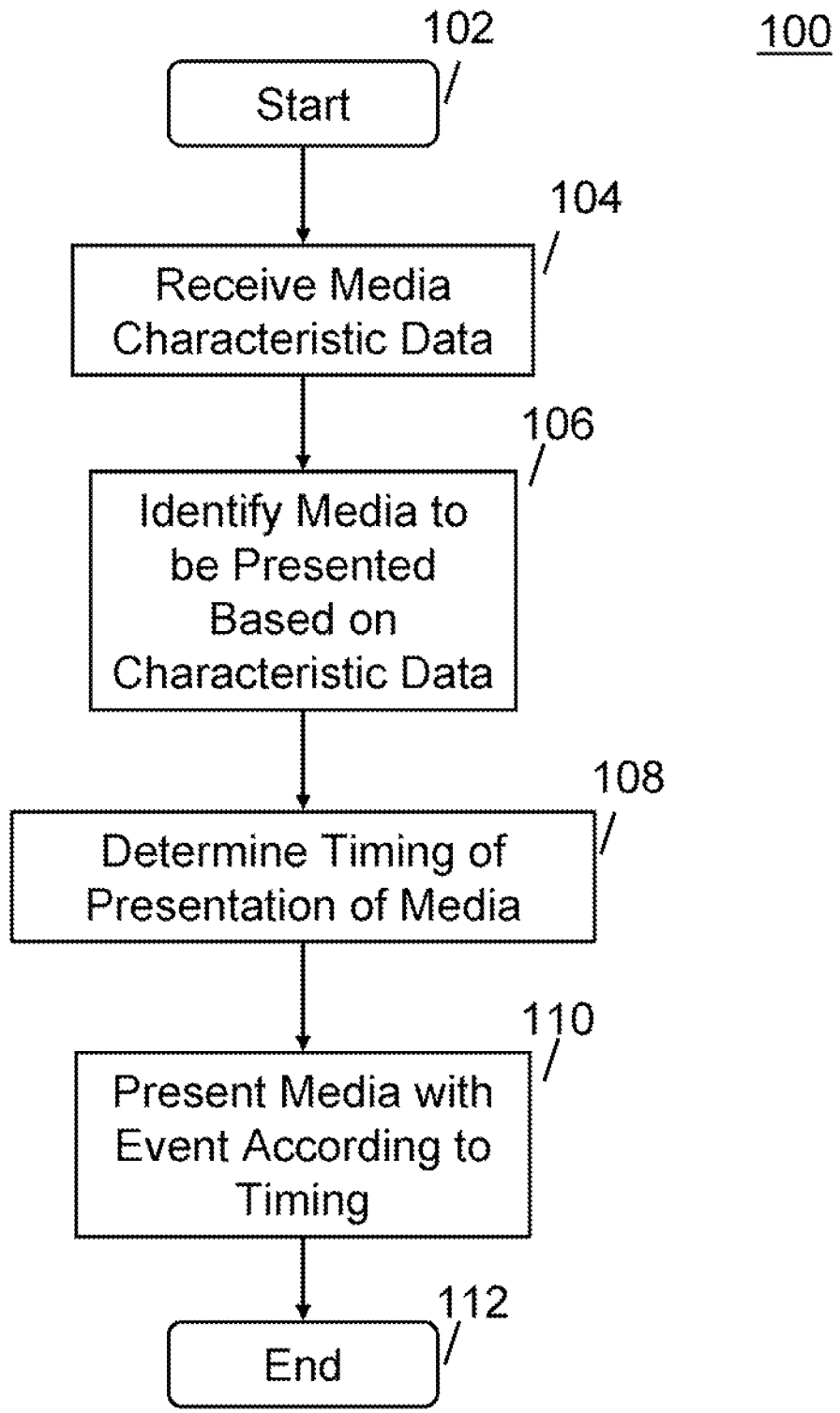
FIG. 1 is an example of a process for identifying media and presenting the media with an event in accordance with some embodiments.

Turning to FIG. 1, a process 100 for presenting media with an event is illustrated. As shown, after process 100 begins at 102, the process receives media characteristic data related to target media for an event at 104. This data may describe any suitable characteristic or characteristics of target media. For example, the data may describe that the target media has certain media type characteristics (such as being a song, being a video, being a sound effect, being an image, etc.), musical characteristics (such as beats per minute, genre (rock, pop, hip-hop, country, etc.), mood characteristics (upbeat, downbeat, etc.), key, etc.), certain content characteristics (such as including certain themes, lyrics, characters, product names, place names, occasions (such as birthday, etc.), etc.), certain use characteristics (such as having been tagged as a favorite piece of media of a user, having been listened to or viewed more than other pieces of media, having been shared most frequently, having been recommended most frequently, having been used in a certain number of playlists, etc.), certain demographic characteristics (such as a song being popular with men, with woman, with people of certain ages, etc.), certain legal/licensing characteristics (such as a piece of media being licensed, being royalty free, being royalty paying, being permitted or not permitted for use with a certain category of product (such as cigarettes or alcohol), etc.), certain social-cause characteristics (such as being associated with environmental issues, human rights issues, free-speech issues, etc.), etc.

Next, at 106, one or more pieces of media to be presented may be identified based on the characteristic data. Any suitable method to identify the media can be used. For example, pieces of available media (such as those pieces of media on a user's device, available for access by a user's device (e.g., via streaming, etc.) may be scored based on the characteristic data, and the media with the highest score may be used. In some embodiments, a score can be based on a weighted measurement of certain characteristics. For non-numerical characteristics, definitions assigning traits of the characteristic to different numbers can be made. For example, genres can be defined for music so that each genre has a numbered position on a musical spectrum: 50's pop (1), 60's pop (2), 70's pop (3), 80's pop (4), and 90's pop (5). A score for number of times a song is listened to, similarity to 70's pop, and beats per minute of 60, can be generated using:

$$score=50\%*[Times\ Listened\ To]+30\%*ABS([genre]-3)+20\%*ABS([bpm]-60)$$

where 50%, 30%, and 20% represent any suitable weights assigned to different characteristics, and ABS( ) represents an absolute value function.

The timing of the presentation of the identified media can then be determined at 108. The timing may be specified based on any suitable data, and can be different for different pieces of media. For example, a song that is very close to a target song can be played during the entire presentation of an advertisement, whereas a song that is not as close may be presented for a shorter period than the entire advertisement. As another example, one song can be presented for a first portion of an advertisement and another song can be presented for a second, later portion of the advertisement.

The media can then be presented with the event according to the timing at 110 and process 100 terminated at 112.

Figure 2:
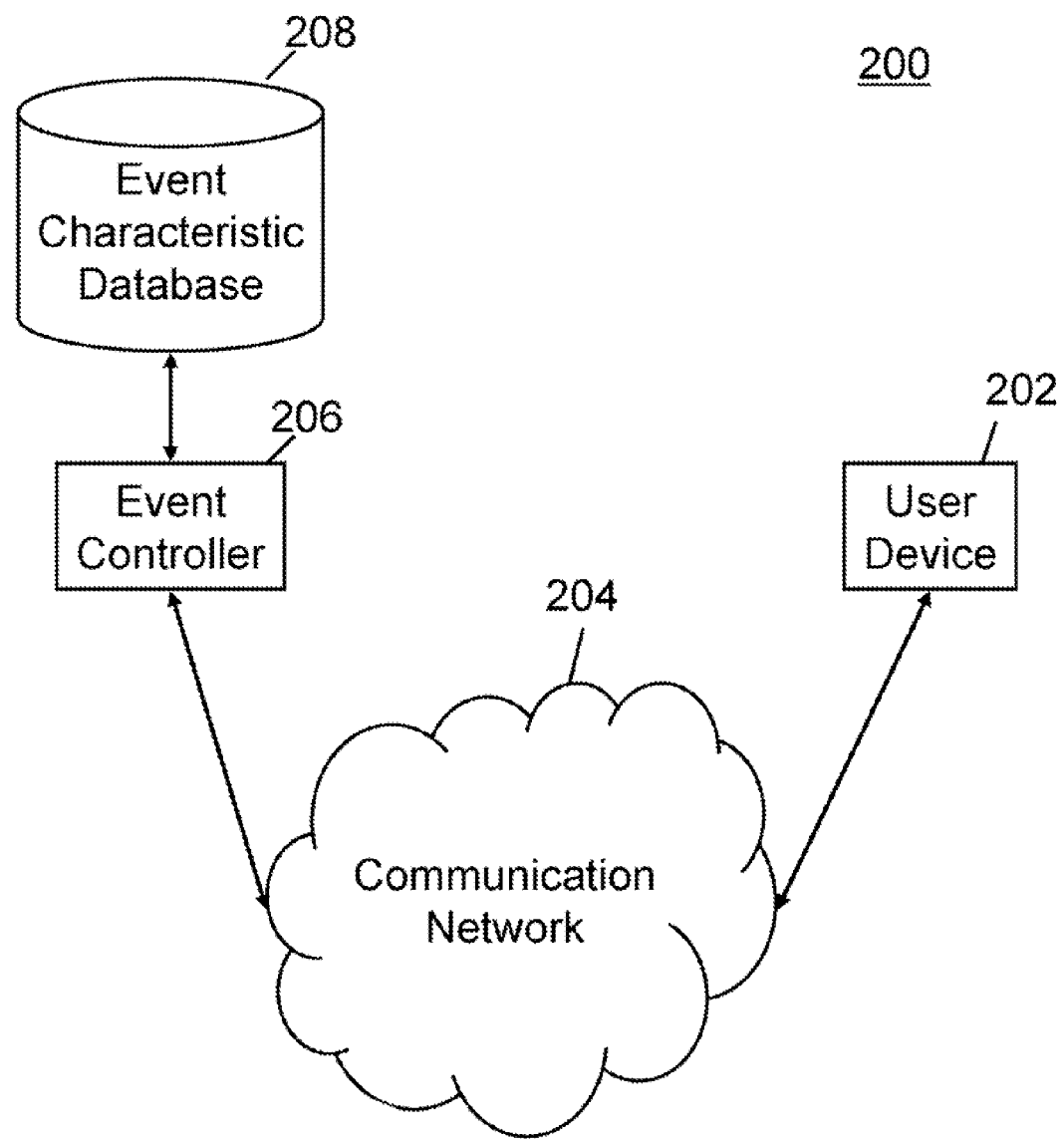
FIG. 2 is an example of hardware that can be used in some embodiments.

FIG. 2 shows an example of hardware 200 that can be used in some embodiments. As illustrated, an event may occur and media for the event may be presented on a user device 202. This device may be any suitable device for the occurrence of the event and the presentation of the media. For example, the device can be a mobile phone, a portable media player, a computer (which can be either portable on non-portable (such as a tablet, laptop, handheld, desktop computer)), a gaming device, an email device, a personal data assistant, etc. This device may be coupled to a communication network 204. Network 204 may include any suitable communication networks, such as the Internet, local area networks, wide area networks, wired networks, wireless networks, cable television networks, satellite networks, telephone networks, etc. An event controller 206 can also be coupled to the communication network. The event controller can determine when the event is to occur on the user device and can specify characteristic data for the media to be presented with the event. The event controller can be any suitable device such as a server, telephone equipment, etc. An event characteristic database 208 can be coupled to event controller 206. The database can include characteristic data for different events and media.

Each of the user devices, event controller, and database can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc.

In some embodiments, the operations shown in 104, 106, and/or 108 of FIG. 1 can be performed in the user device, the event controller, and/or one or more other devices. For example, in some embodiments, media characteristic data can be received in the event controller, the media to be presented can next be identified by the event controller, and the timing of the presentation of the media can be determined by the event controller. As another example, in some embodiments, the media characteristic data can be received in the user device, the media to be presented can next be identified by the user device, and the timing of the presentation of the media can be determined by the user device. As yet another example, in some embodiments, the media characteristic data can be received in the event controller and the user device, the media to be presented can next be identified by the event controller, and the time of the presentation of the media can be determined by the user device.

In some embodiments, statistics can be determined for media available for presentation on multiple user devices. For example, statistics can be determined regarding the number of user devices that have songs that would meet a score threshold for matching an event to be presented on user devices. These statistics can then be used by an event controller to price the delivery of that event (e.g., an advertisement) on the user devices.

In some embodiments, data regarding media available for presentation on user devices can be used to select events to occur on certain user devices. For example, based on a user device being identified as containing a certain song, an event (such as the presentation of a corresponding advertisement) can be selected to occur on that user device.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory; electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for coordinating the presentation of media with an advertisement, comprising:
at least one processor that:
receives media characteristic data associated with target media to be presented during a presentation of the advertisement;
identifies presentation media as being target media based on the presentation media matching the media characteristic data;
automatically determines a timing of a presentation of the presentation media with respect to the presentation of the advertisement; and
presents the presentation media during the presentation of the advertisement according to the timing.

2. The system of claim 1, wherein the presentation media is at least one of video, images, audio, and multimedia.

3. The system of claim 1, wherein the media characteristic data describes the target media as having at least one of certain media type characteristics, musical characteristics, mood characteristics, content characteristics, use characteristics, demographic characteristics, legal/licensing characteristics, and social-cause characteristics.

4. The system of claim 1, wherein the at least one processor, in identifying presentation media, determines scores for one or more pieces of media based on the characteristic data.

5. The system of claim 4, wherein the scores are based on a weighting of two or more characteristics.

6. The system of claim 1, wherein the timing specifies the duration of the presentation of the presentation media during the advertisement.

7. The system of claim 1, wherein the timing specifies the start point of the presentation of the presentation media during the advertisement.

8. The system of claim 1, wherein the at least one processor also determines statistics for media available for presentation on multiple user devices.

9. The system of claim 1, wherein the at least one processor also determines whether the advertisement is to occur based on an availability of certain media for the advertisement.

10. A method for coordinating the presentation of media with an advertisement, comprising:
receiving media characteristic data associated with target media to be presented during a presentation of the advertisement at at least one processor;
identifying at the at least one processor presentation media as being target media based on the presentation media matching the media characteristic data;
automatically determining a timing of a presentation of the presentation media with respect to the presentation of the advertisement at the at least one processor; and
causing the presentation media to be presented during the presentation of the advertisement according to the timing using the at least one processor.

11. The method of claim 10, wherein the presentation media is at least one of video, images, audio, and multimedia.

12. The method of claim 10, wherein the media characteristic data describes the target media as having at least one of certain media type characteristics, musical characteristics, mood characteristics, content characteristics, use characteristics, demographic characteristics, legal/licensing characteristics, and social-cause characteristics.

13. The method of claim 10, wherein the identifying presentation media includes determining scores for one or more pieces of media based on the characteristic data.

14. The method of claim 13, wherein the scores are based on a weighting of two or more characteristics.

15. The method of claim 10, wherein the timing specifies the duration of the presentation of the presentation media during the advertisement.

16. The method of claim 10, wherein the timing specifies the start point of the presentation of the presentation media during the advertisement.

17. The method of claim 10, further comprising determining statistics for media available for presentation on multiple user devices.

18. The method of claim 10, further comprising determining whether the advertisement is to occur based on an availability of certain media for the advertisement.

19. A computer-readable non-transitory medium containing computer-executable instructions that, when executed by a processor, cause the processor to perform a method for coordinating the presentation of media with an advertisement, the method comprising:
receiving media characteristic data associated with target media to be presented during a presentation of the advertisement;
identifying presentation media as being target media based on the presentation matching the media characteristic data;
automatically determining a timing of a presentation of the presentation media with respect to the presentation of the advertisement; and
causing the presentation media to be presented during the presentation of the advertisement according to the timing.

20. The non-transitory medium of claim 19, wherein the presentation media is at least one of video, images, audio, and multimedia.

21. The non-transitory medium of claim 19, wherein the media characteristic data describes the target media as having at least one of certain media type characteristics, musical characteristics, mood characteristics, content characteristics, use characteristics, demographic characteristics, legal/licensing characteristics, and social-cause characteristics.

22. The non-transitory medium of claim 19, wherein the identifying presentation media includes determining scores for one or more pieces of media based on the characteristic data.

23. The non-transitory medium of claim 22, wherein the scores are based on a weighting of two or more characteristics.

24. The non-transitory medium of claim 19, wherein the timing specifies the duration of the presentation of the presentation media during the advertisement.

25. The non-transitory medium of claim 19, wherein the timing specifies the start point of the presentation of the presentation media during the advertisement.

26. The non-transitory medium of claim 19, wherein the method further comprises determining statistics for media available for presentation on multiple user devices.

27. The non-transitory medium of claim 19, wherein the method further comprises determining whether the advertisement is to occur based on an availability of certain media for the advertisement.

* * * * *